United States Patent [19]

Kakae et al.

[11] Patent Number: 5,426,520
[45] Date of Patent: Jun. 20, 1995

[54] METHOD OF LEGITIMATE PRODUCT IDENTIFICATION AND SEALS AND IDENTIFICATION APPARATUS

[75] Inventors: Hayao Kakae, Suita; Isao Isaka, Izumi, both of Japan

[73] Assignees: Shoei Printing Co., Ltd.; AMC Co., Ltd., both of Osaka, Japan

[21] Appl. No.: 970,339

[22] Filed: Nov. 2, 1992

[30] Foreign Application Priority Data

Nov. 8, 1991 [JP] Japan .................................. 3-321174

[51] Int. Cl.⁶ .............................................. G03H 1/00
[52] U.S. Cl. .................................... 359/2; 359/29; 359/32; 235/457; 235/472; 283/81; 283/86
[58] Field of Search .............. 359/29, 27, 32, 2, 900; 235/457, 462, 472; 283/79, 80, 81, 86; 356/71

[56] References Cited

U.S. PATENT DOCUMENTS

| | | | |
|---|---|---|---|
| 3,620,590 | 11/1971 | Barker | 380/54 |
| 4,353,622 | 10/1982 | Gale et al. | 359/900 |
| 4,603,262 | 7/1986 | Eastman et al. | 235/472 |
| 5,063,508 | 11/1991 | Yamada et al. | 235/472 |
| 5,105,070 | 4/1992 | Wike, Jr. et al. | 235/472 |
| 5,107,100 | 4/1992 | Shepard et al. | 235/472 |
| 5,142,384 | 8/1992 | Wood et al. | 359/1 |

OTHER PUBLICATIONS

R. Collier et al, *Optical Holography*, Academic Press, New York, 1971, p. 209.

*Primary Examiner*—Scott J. Sugarman
*Assistant Examiner*—Thomas Robbins
*Attorney, Agent, or Firm*—Jordan and Hamburg

[57] ABSTRACT

A Fourier transform hologram image is created on a sheet on the seal. The image is made, by making a die from the Fourier transform hologram image master plate and by molding resin on the die. The image formed on the sheet is reconstructed by an identification apparatus. The identification apparatus contains the laser emitting device and the screen for receiving the reflecting laser beam. The laser beam is illuminated vertically against the sheet from the laser emitting device. The laser beam reflected from the sheet surface is received by the screen, and the image of the sheet is reconstructed on the screen. At this time, it is possible to check whether the laser beam is reaching the sheet from an opening in the casing.

3 Claims, 8 Drawing Sheets

| INFORMATION FACTOR | 0 | 1 | 2 | 3 |
|---|---|---|---|---|
| INFORMATION FACTOR BASIC CODE |  |  |  |  |
| INFORMATION FACTOR | 4 | 5 | 6 | 7 |
| INFORMATION FACTOR BASIC CODE |  |  |  |  |
| INFORMATION FACTOR | 8 | 9 | | |
| INFORMATION FACTOR BASIC CODE |  |  | | |

METHOD OF LEGITIMATE PRODUCT IDENTIFICATION AND SEALS AND IDENTIFICATION APPARATUS

BACKGROUND OF THE INVENTION

1. Field of the Invention

This invention relates to a legitimate product identification method and the seal and identification apparatus that are used for this purpose: particularly, for example, the legitimate product identification method and the seal and identification apparatus identifies whether products pasted with seals are genuine or not.

2. Description of the Prior Art

Hitherto, in order to identify the origin of products, labels or seals were pasted on the products. On these labels and seals, for example, product names, manufacturer's names, distributor's names, manufacturing dates, and manufacturing numbers are printed to clarify who are liable for the products.

Furthermore, in order to prevent forgery of these labels and seals, the seal containing a holographic image is used. In these labels and seals, the image is created by a rainbow hologram. The image created by the rainbow hologram can reproduce a relatively sharp three-dimensional picture, even using the sun light or ordinary white light as a reconstruction beam.

In order to make an image by a rainbow hologram, a relatively high degree of technology is needed, and it is not easy to commit forgery. Therefore, by pasting these labels and seals, it is possible to prove that a product is manufactured by the original manufacturer and distributed through a legitimate channel.

However, printed labels and seals are easy to forge. For this reason, it is possible to deceive retailers and consumers by pasting forged seals, etc. on inferior products.

Also, in spite of its difficulty in forging labels and seals with rainbow hologram images; recently, it has become feasible to forge seals with such image holograms. The image formed on such forged seals, is not sharp comparing to an image created by a highly skilled engineer, but it is difficult for a retail clerk and a consumer to recognize accurately whether a seal is genuine or forged by a visual inspection.

SUMMARY OF THE INVENTION

Therefore, the main objective of this invention is to provide a legitimate product identification method that can accurately identify whether a product is genuine or not.

Also, the other objective of this invention is to provide seals and an identification apparatus for such a legitimate product identification method.

This invention relates to a legitimate product identification method, which includes the seal with a holographic image and the identification apparatus to read the image formed on the seal; and in which the laser beam is illuminated on a surface of the seal where the image is formed, and the reflected laser beam from the image surface is reconstructed on a screen of the identification apparatus to identify the legitimacy of a product.

Also, this invention utilizes the seal, which is made by using a die of the master plate on which a Fourier transform hologram is formed, and resin is molded using this die to copy the image of the Fourier transform hologram.

Furthermore, this invention concerns the identification apparatus which includes a casing, a laser emitting device attached to the casing, and a screen which is attached on the reflection side of the laser beam to receive the laser beam which is reflected from the hologram surface.

The hologram image in this invention cannot be reconstructed by natural illumination, and the image can be reconstructed on a screen by reflecting a laser light against the surface where the image is formed. This hologram image is formed by an interference pattern of the laser beam, and its resolution is 1000-2000 lines/mm.

According to this invention, since the image cannot be reconstructed by natural illumination, the visual inspection cannot determine what image is formed on a seal. For this reason, in order to reconstruct the image formed on the seal, an identification apparatus which emits the laser light to reconstruct the image must be used, and using this apparatus one can reconstruct a sharp image. Therefore, by pasting a seal on which a hologram image is formed, the legitimate product identification is possible by the identification apparatus.

As the image of the seal, for example, by making specific codes for merchandise, manufacturer, and distributor, one can identify the legitimacy of the origin of a product from the code. Moreover, a Fourier transform hologram is an image of the interference pattern of laser light, and is has high resolution and more accurate and finer than the rainbow hologram; and it is difficult to forge. Therefore, forgery of the seal that can identify the legitimacy of a product can be prevented.

Also, in the seal on which the Fourier transform hologram is formed, by adjusting the photographing condition, the image can be reconstructed on a fixed position on the screen by shining laser light on any part of the surface. Therefore, even if a seal is damaged, as long as a section remains, it is possible to identify the legitimacy of the product. Furthermore, even if the distance between the identification apparatus and the seal changes, a sharp image can be reconstructed on the screen to make the identification easy.

This invention's above stated objectives, other objectives, characteristics, aspects, and advantages will become further evident from the detail explanations of the embodiments below.

DESCRIPTION OF THE PREFERRED EMBODIMENTS

Figure 1:
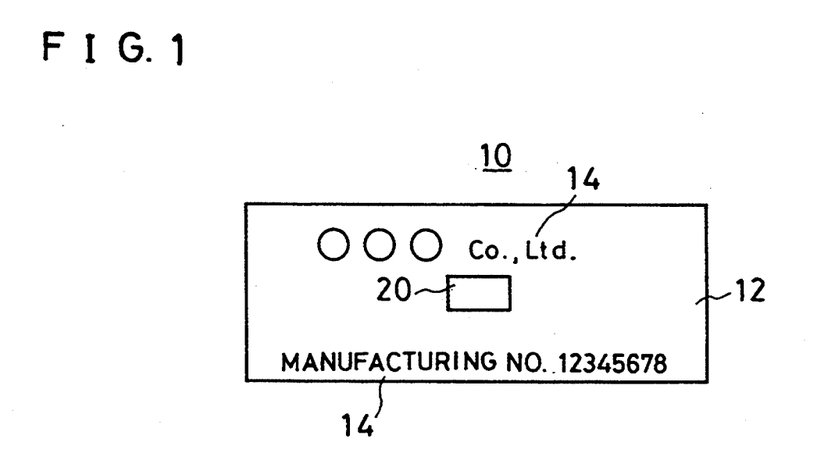
FIG. 1 is a plan view which shows an example of a seal that identifies the legitimacy by this invented method.

FIG. 1 is an illustration of an example of a seal that can identify legitimacy of a product using this invented legitimate product identification method. Seal 10 contains sheet material 12 which includes, for example, paper and synthetic resin. On sheet material 12, display 14 containing a product name, manufacturer's name, distributor's name, manufacturing date, and manufacturing number is formed. Also, on a main surface of sheet material 12, sheet 20 which has an image formed by a Fourier transform hologram is pasted. Furthermore, on the other side of sheet material 12, an adhesive layer is formed.

Figure 2:
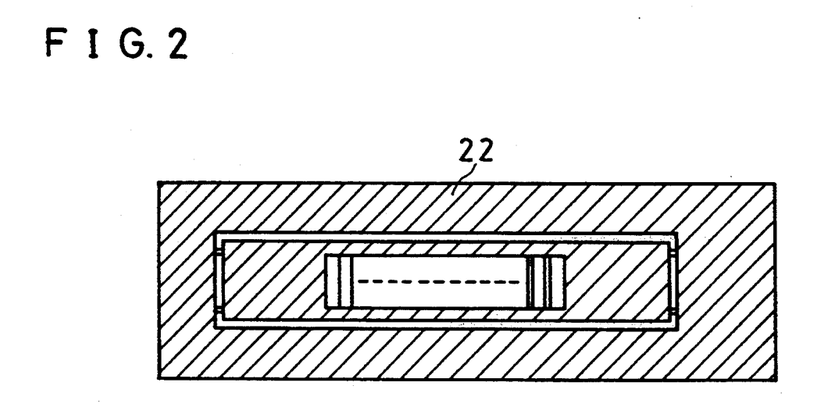
FIG. 2 is an illustration which shows a photographing master plate used in making a legitimate identification sheet.
Figure 3:
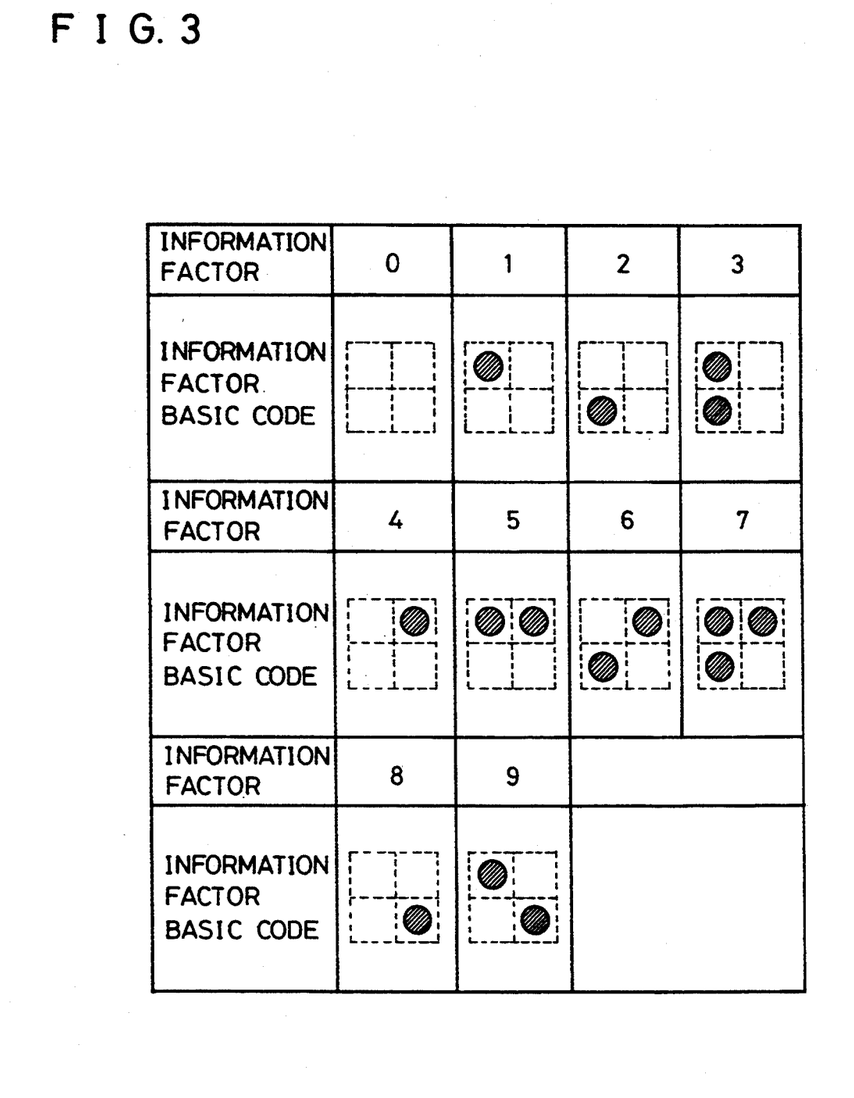
FIG. 3 is a table that shows an example of numerical codes recorded on the sheet.

In order to form an image by the Fourier transform hologram, as shown in FIG. 2, a photographing master plate 22 is formed first. On the photographing master plate 22, a pattern such as a certification code is made. As the certification code, bar coded numbers and, as shown in FIG. 3, numbers are coded. In FIG. 3, it corresponds to each number by darkening one of four squares.

These certification codes are formed as patterns, for example, on a stainless steel plate to produce the photographing master plate 22. In this case, a pattern is formed by a laser tool, and black paint is applied to make the photographing master plate 22 surface look like a pear skin. Also, as an alternative method, a pattern is printed on a lithographic film to form the photographing master plate 22. Moreover, using a printed lithographic film, a photo-resist pattern is created on a stainless steel plate; and after etching it with ferric chloride, it is parkerized to form a photographic master plate 22.

Figure 4:
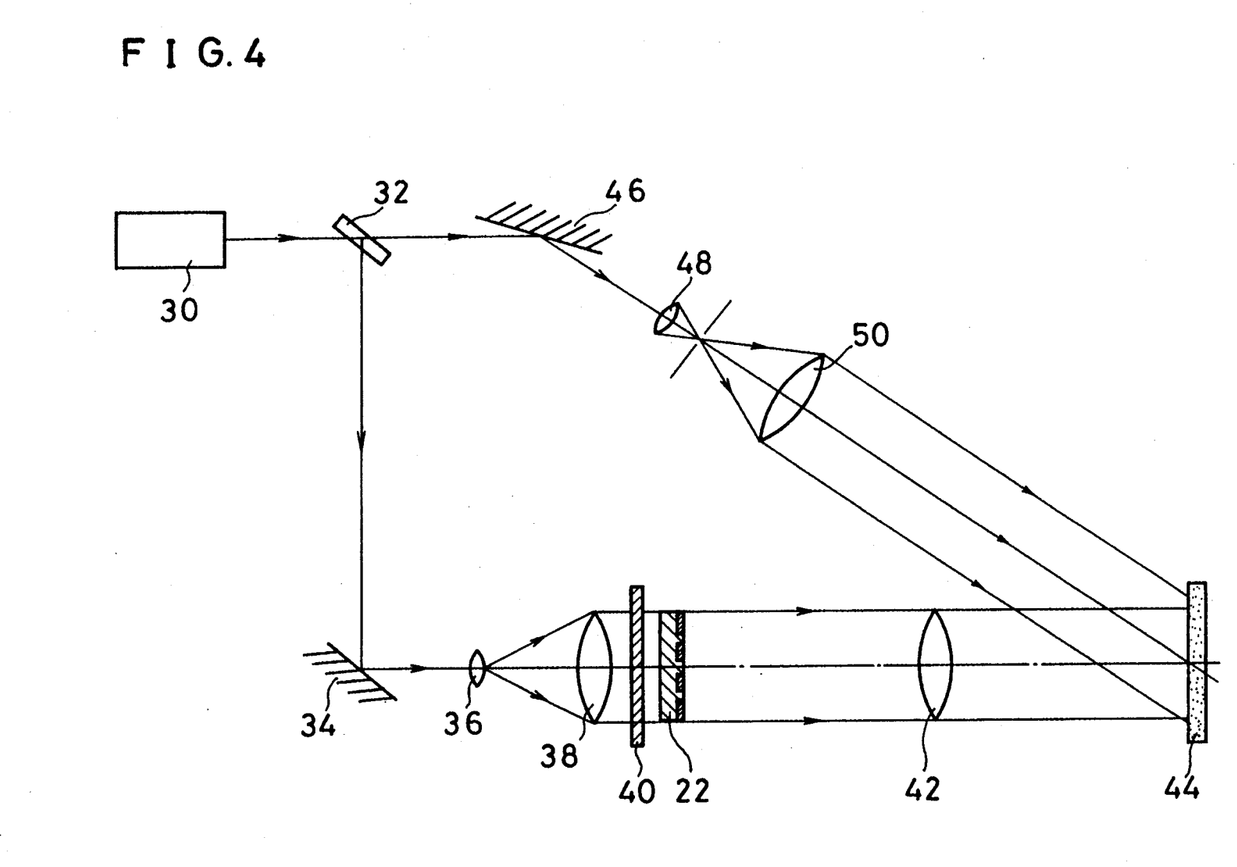
FIG. 4 is an illustration which shows the optical system used in a Fourier transform hologram.

Using the photographing master plate 22, and using the optical system in FIG. 4, the Fourier transform hologram is produced. In this optical system, the laser beam is emitted from a laser emitting device 30, and is split into 2 beams by a half mirror 32. A laser beam reflected by the half mirror 32, is reflected by a reflection mirror 34 and will diverge by passing through lenses 36 and 38. The spread beam, passing through a diffraction plate 40 and the photographing master plate 22, will become the object beam. The object beam is focussed by a Fourier tranform lens 42 and projected against a photographic dry plate 44. The photographing master plate 22 and the photographic dry plate 44 are placed either at a front focal point or a back focal point. In this example, a focal distance of the Fourier transform lens 42 is a short focal distance of 50 mm. Moreover, by using the diffraction plate 40, the information on the photographing master plate 22 is evenly distributed.

The laser beam passing through the half mirror 32 is reflected by a reflection mirror 46, and is diverged by lenses 48 and 50. This diverged laser beam, keeping a set angle to the object beam, is projected against the photographic dry plate 44 as the reference beam. Therefore, an interference pattern is created by the object beam and the reference beam on the photographic dry plate 44. Thus, the information of the photographing master plate 22 is formed on the photographic dry plate 44 by the Fourier transform hologram image.

Figure 5:
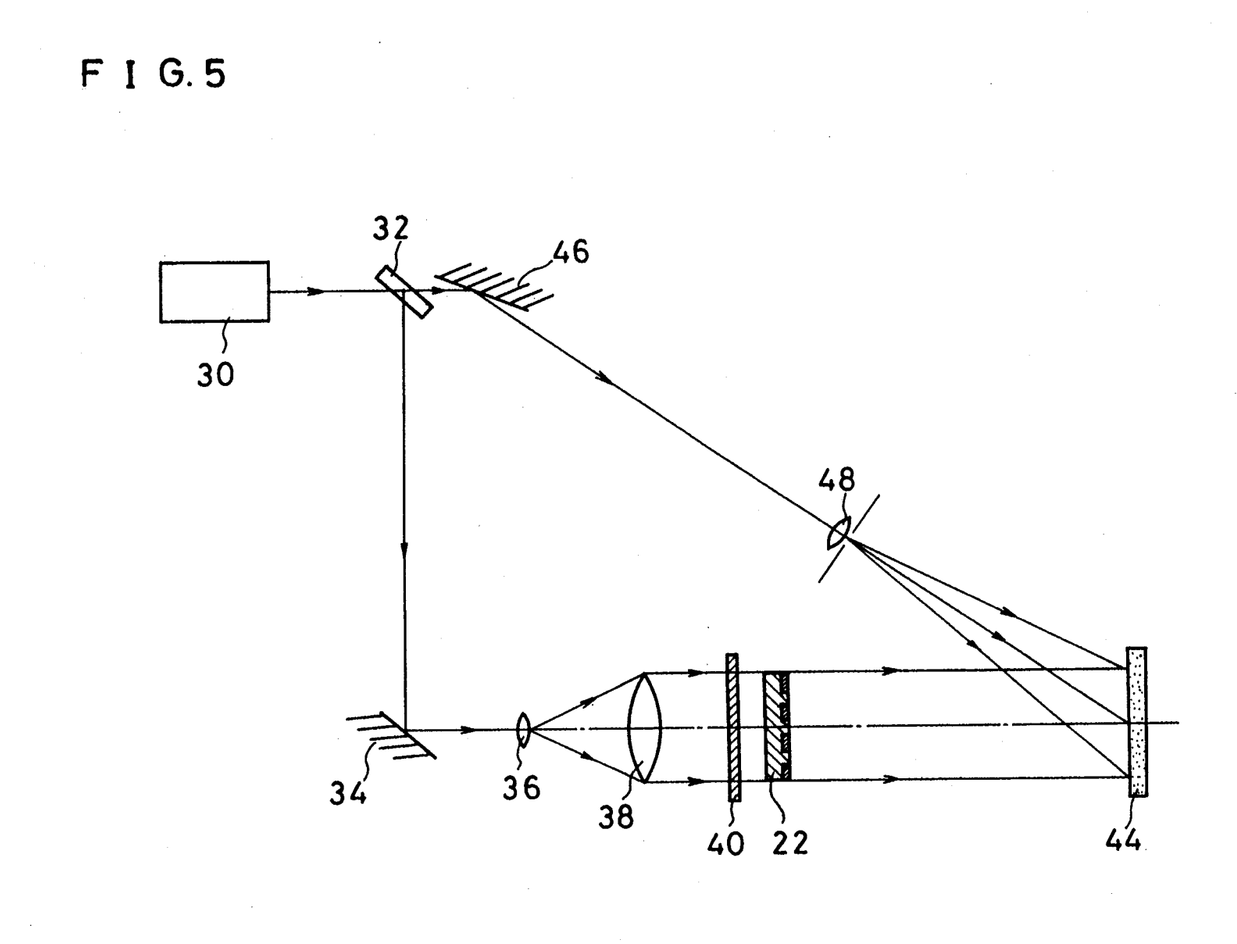
FIG. 5 is an illustration which shows the optical system used in a lensless Fourier transform hologram.

Also, in order to create an image by the Fourier transform hologram, as shown in FIG. 5, a lens-free Fourier transform hologram method can be used. In this method, the object beam is not focused by a Fourier transform lens and projected against the photographic dry plate 44. Also, the reference beam is diverged by a lens 48 and illuminated against the photographic dry plate 44. It is set so that the distance between the photographing master plate 22 and the photographic dry plate 44 and that of lens 48 and the photographic dry plate 44 are the same. In this method, the object beam on the photographic dry plate 44 is a Fresnel diffracted wave; but when it is being recorded, the second phase peak cancels the effect of the second phase peak of the reference beam, resulting in a hologram similar to the Fourier transform hologram.

Since these holograms keep records of the interference patterns by their concave-convex fringes on the surface, it is possible to duplicate it in large quantity by making a die from this concave-convex surface and hot pressing thermoplastic plastics with it. A manufacturing method for an embossed hologram obtained above is explained below referencing FIG. 6.

First of all, as shown in (A), the hologram obtained is prepared as the master plate 60. On this master plate 60, as shown in (B), metals such as Au and Ag are vapor deposited, a conducting metal layer 62 is made. On this metal layer 62, as shown in (C), a nickel plated layer 64 is formed. And, as shown in (D), the nickel plate is peeled off to form a die 66. By hot pressing thermoplastic plastics using this die 66, as shown in (E), a hologram layer 68 which is a duplicate of the master plate 60 is obtained. Secondly, as shown in (F), a vapor deposition layer 70 is made by the vapor deposition of Al, etc. on the hologram surface of the hologram forming layer 68; and an adhesive layer 72 is formed on the vapor deposition layer 70. Moreover, on the non-hologram forming side of the hologram forming layer, a peel-off layer 74 and the substrate 76 are formed. Thus, an embossed hologram seal 78 is obtained.

Figure 6A:
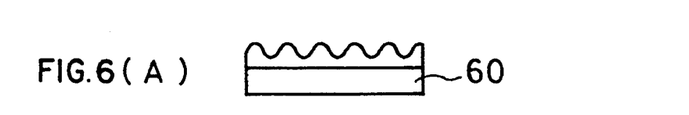
FIG. 6(A) through FIG. 6(G) are illustrations that show manufacturing processes of an embossing hologram using the Fourier transform hologram as the master plate.
Figure 6B:
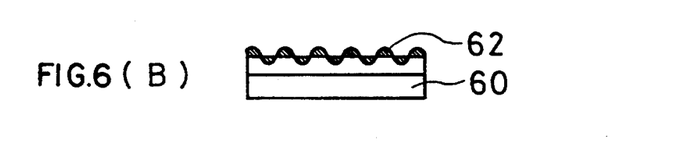
Figure 6C:
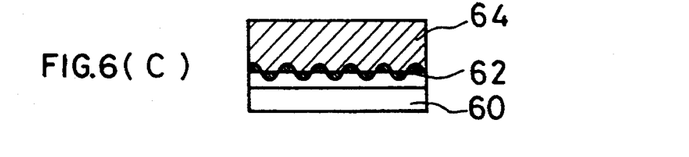
Figure 6D:
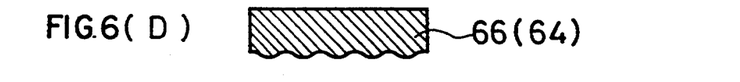
Figure 6E:
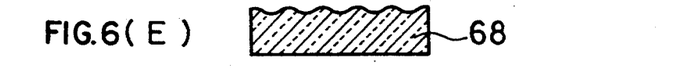
Figure 6F:
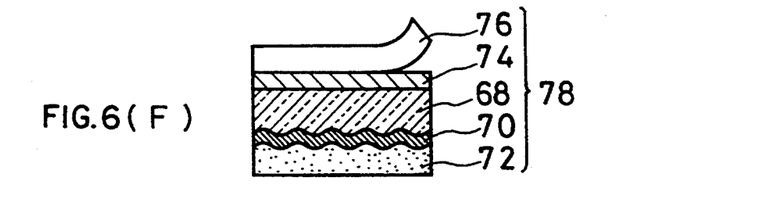
Figure 6G:
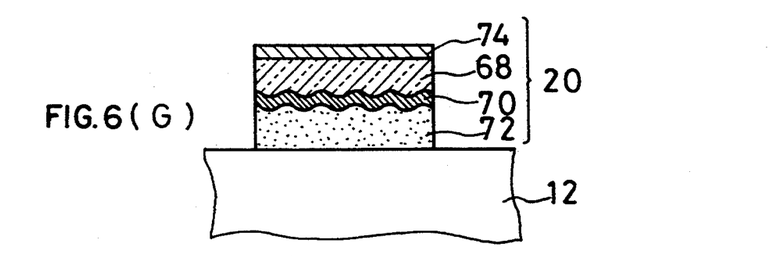

And, as shown in (G), the embossed hologram seal 78 obtained above is pasted on a sheet substrate 12; and by peeling off the substrate 76, a sheet 20 with a Fourier transform hologram image is formed. This sheet 20 has a thickness of several micro meters including a hologram forming layer 68, the vapor deposition layer 70, the adhesive layer 72, and the peel-off layer 74; and it can be formed with no appreciable height difference from the sheet substrate 12.

Figure 7:
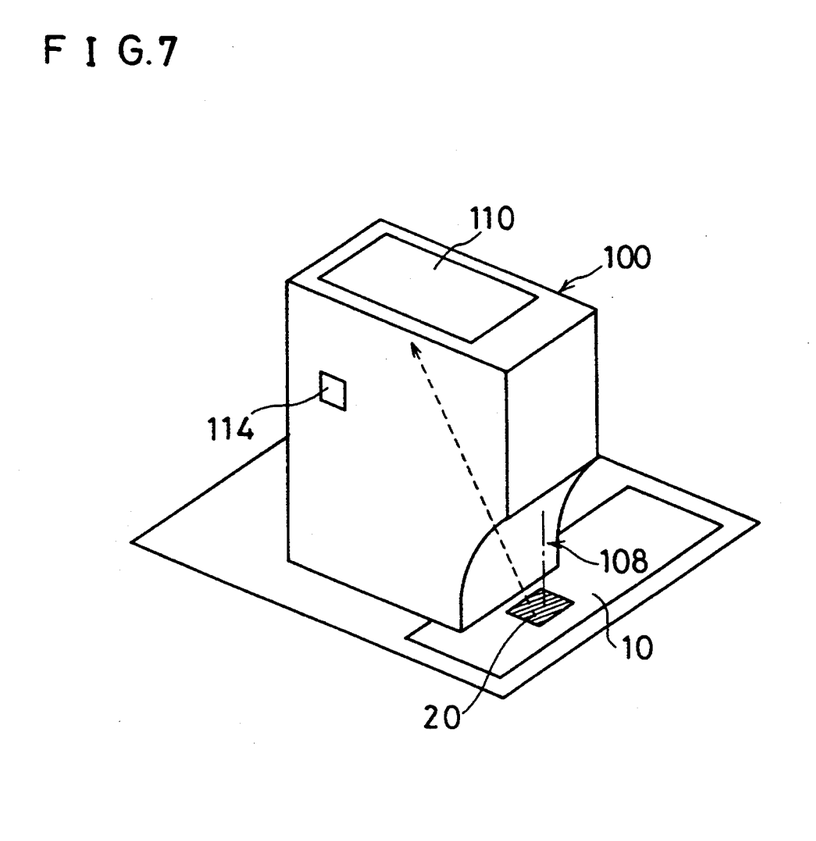
FIG. 7 is an oblique view of an example of an identification apparatus used in this invention method.
Figure 8A:
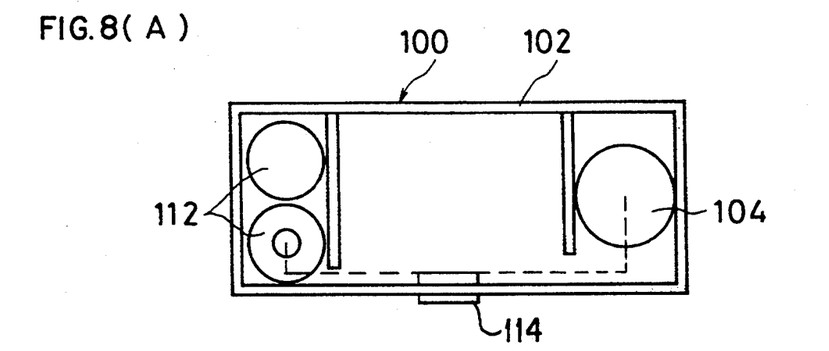
FIG. 8(A) is an illustrated plan view of the identification apparatus in FIG. 7.
Figure 8B:
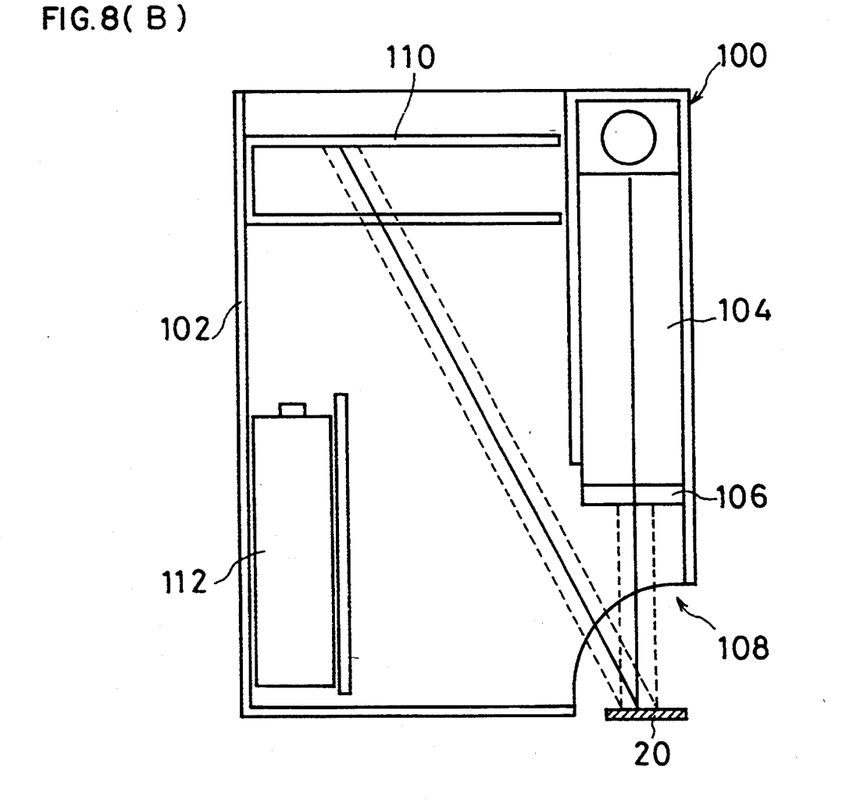
FIG. 8(B) is its frontal illustration.

The image which is recorded on the sheet 20, can be reconstructed by the identification apparatus 100. The identification apparatus 100, as shown in FIG. 7, is used placing it on the sheet 20. This identification apparatus 100, as shown in FIGS. 8(A) and (B), includes a casing 102. In the casing 102, a laser emitting device 104 is attached. To this laser emitting device 104, a divergent lens 106 is attached, and by adjusting the divergent lens 106, it is possible to vary the width of a laser beam. Particularly, by spreading the width of a laser beam, it increases the eye safety.

At a corner of the casing 102 near the laser reflection part, an opening 108 is formed. By having an opening 108, it is possible to check whether the laser beam is illuminating the sheet 20 or not. Furthermore, a screen 110 is attached adjacent to the laser emitting device 104 inside the casing 102. The screen 110 is attached so that its main surface is parallel to the main surface of the sheet 20. And, the laser beam reflected from the sheet 20 illuminates on this screen 110, and the image formed on the sheet 20 is reconstructed. This screen 110 has transmission divergency, and it has a fine concavo-convex structure. This is to sharpen the reconstructed image by the laser beam.

Furthermore, batteries 112 to operate a laser emitting device 104 are encased in the casing 102. Moreover, a switch 114 is attached outside of the casing 102 to emit a laser beam by the laser emitting apparatus 104. As a switch 114, a timer can be attached so that after a certain time of the laser emittance it will automatically shut off. This way, it is possible to avoid depletion of batteries 112 by forgetting to turn off the switch 114.

When identifying the legitimacy of a product pasted with the seal 10 by using this identification apparatus 100, the laser beam emitted from the laser emitting device 104 is illuminated vertically on the sheet 20. This laser beam becomes the reconstruction beam, and it reconstructs the image on the screen 110. This image is the transferred image to the sheet 20, and as stated above, it can be numbers or coded numbers. Therefore, by reading the image of the sheet 20 using the identification apparatus 100, a legitimate product can be identified. Moreover, when the laser beam is illuminated obliquely against the sheet 20, the image of the sheet 20 can be reconstructed on a screen which is vertical to the surface of the sheet 20. However, in this case, the laser emitting apparatus must be attached obliquely, and the manufacturing becomes complex. Also, when the sheet 20 is small, it is difficult to obliquely illuminate it. Therefore, it is desirable to have the laser beam vertically illuminate the surface of the sheet 20.

When the legitimacy of a product is identified using this method, unless the identification apparatus is used, it is impossible to understand the content recorded on the sheet 20; it can clearly identify the legitimacy of a product, if specific codes for a manufacturer and a distributor are recorded. Also, while a rainbow hologram image has the resolution of 100–200 lines/mm, the Fourier transform hologram has the resolution of 1000–2000 lines/mm, and it is technically difficult to forge. Furthermore, when a hologram is being photographed, if a special diffraction plate 40 is used, the same diffraction plate must be used to reconstruct the same hologram, which is difficult to forge. Also, when forging a hologram the same photographing condition must be met; and the photographing condition, such as the wave length of a laser beam, incident angles of the object beam and the reference beam, the size and position of the photographing master plate and the photographic dry plate, must be identical. It is difficult to find out the photographing condition from a pasted sheet 20 on a product, so it is difficult to forge the sheet 20. For the reasons given above, this invented legitimate product identification method is more accurate than the identification method by a printed seal and a conventional rainbow hologram.

In a hologram made by the above method, since it takes photographs using the diffraction plate 40, and the information of the photographing master plate 22 is diffracted on the photographic dry plate 44, the image can always be reconstructed at a fixed position of the sheet screen 110, even when the laser beam is illuminated on any part of the sheet 20. Therefore, even when the sheet 20 is damaged, as long as a part remains, the identification is possible. Moreover, when photographing a hologram, if a short focus Fourier transform lens 42 is used and if the distance exceeds its focal distance, at the time of reconstruction, it becomes focus free. Therefore, even when the distance between the sheet 20 and the identification apparatus 100 changes, a focused image on the screen 110 can be reconstructed.

Also, the identification apparatus 100 used in this invention, can be made safe by using a low power laser emitting device 104, and it can be manufactured economically and the miniaturization is possible. Therefore, it will lighten the financial burden of retailers who will use this identification apparatus 100.

Figure 9:
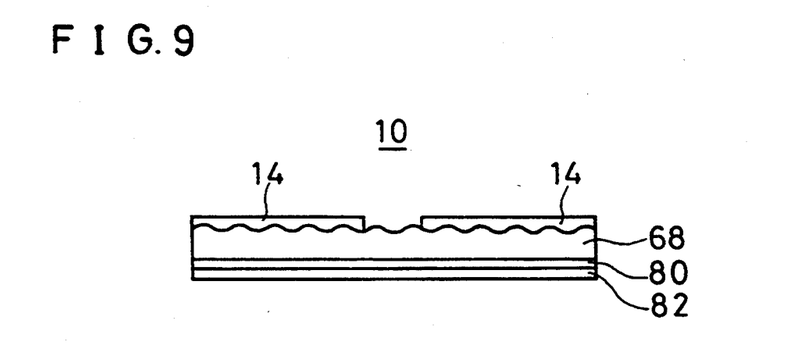
FIG. 9 is an illustration which shows other examples of this invented seal.

Furthermore, in the above embodiments, the sheet 10 is made by pasting the sheet 20 on the sheet substrate 12; but the sheet 10 can be made without using the sheet substrate as shown in FIG. 9. In this case, the A1 vapor deposition layer 80 is formed on a hologram forming layer 68 of FIG. 6(E), and the adhesive layer 82 is added. And, a display 14 is printed on the hologram forming layer 68 itself. At this time, by not printing a part of the sheet 20, a hologram image can remain.

This legitimate product identification method is useful for the legitimate product identification of various products, and insures the legitimacy of products and safeness. As products that can use this seal 10 are, for example, such as credit cards, telephone cards, CPU boards, rice, revenue stamps, neck ties, belts, golf balls, golf clubs, rackets, and jewels; and by changing the size of the seal 10, it can be applied to any product for its legitimate product identification.

What is claimed is:

1. An identification apparatus including:
   a casing including a laser beam reflection area for receiving a seal having a holographic image formed thereon and an opening near said laser beam reflection area;
   laser emitting means, attached to said casing, for illuminating vertically a laser beam on a hologram surface of said seal having the holographic image formed thereon;
   screen means, attached to said casing, for receiving the laser beam reflected from the hologram surface and displaying the holographic image thereon; and
   lens means in said casing for adjusting divergency of said laser beam.

2. An identification apparatus in accordance with claim 1, wherein said screen has a transmission divergency and a concave-convex surface.

3. An identification apparatus in accordance with claim 2, further including power source means, in said casing and connected to said laser emitting means, for supplying power to said laser emitting means and timer switch means for turning off the power source means to interrupt power to said laser emitting means after a predetermined period of time.

* * * * *